(12) United States Patent
Harris

(10) Patent No.: US 8,997,312 B1
(45) Date of Patent: Apr. 7, 2015

(54) WHEEL ATTACHMENT ASSEMBLY

(71) Applicant: John E. Harris, Tupelo, MS (US)

(72) Inventor: John E. Harris, Tupelo, MS (US)

( * ) Notice: Subject to any disclaimer, the term of this patent is extended or adjusted under 35 U.S.C. 154(b) by 0 days.

(21) Appl. No.: 14/156,300

(22) Filed: Jan. 15, 2014

(51) Int. Cl.
*B60B 33/00* (2006.01)
*B60D 1/66* (2006.01)

(52) U.S. Cl.
CPC ............ *B60B 33/0002* (2013.01); *B60D 1/665* (2013.01)

(58) Field of Classification Search
CPC   B60B 33/00; B60B 33/0007; B60B 33/0018; B60B 33/0021; B60B 33/0039; B60B 33/0049
USPC .............................................. 16/18 R, 29, 40
See application file for complete search history.

(56) References Cited

U.S. PATENT DOCUMENTS

| | | | | |
|---|---|---|---|---|
| 2,175,317 | A * | 10/1939 | Rogers | 16/30 |
| 2,461,652 | A * | 2/1949 | Montgomery, Sr. | 16/31 R |
| 2,523,659 | A * | 9/1950 | Heffernan | 16/18 CG |
| 2,926,930 | A | 3/1960 | Pease | |
| 3,217,478 | A | 11/1965 | De Geere | |
| 3,703,020 | A * | 11/1972 | Skupas et al. | 16/31 R |
| 3,964,124 | A * | 6/1976 | Crawford | 16/21 |
| 4,219,213 | A | 8/1980 | Butcher | |
| 4,889,357 | A | 12/1989 | Perry | |
| 4,922,574 | A * | 5/1990 | Heiligenthal et al. | 16/35 R |
| D318,355 | S | 7/1991 | Salvesan | |
| 5,282,605 | A | 2/1994 | Sauber | |
| 5,822,829 | A * | 10/1998 | Webb et al. | 16/30 |
| 6,298,950 | B1 * | 10/2001 | Oelrichs et al. | 188/20 |
| 6,478,325 | B1 | 11/2002 | Knauff | |
| 6,725,501 | B2 * | 4/2004 | Harris et al. | 16/35 R |
| 6,826,800 | B2 * | 12/2004 | Kao | 16/31 R |
| 7,356,877 | B2 * | 4/2008 | Kim et al. | 16/32 |
| 8,020,679 | B2 * | 9/2011 | Wu | 190/18 A |
| 2002/0004968 | A1 * | 1/2002 | Yeh | 16/48 |
| 2003/0019705 | A1 * | 1/2003 | Lau | 190/18 A |
| 2004/0134027 | A1 * | 7/2004 | Guttmann et al. | 16/18 R |
| 2009/0019669 | A1 * | 1/2009 | Jones et al. | 16/35 R |
| 2011/0187080 | A1 * | 8/2011 | Wallace | 280/476.1 |
| 2012/0005858 | A1 * | 1/2012 | Lai | 16/45 |

* cited by examiner

*Primary Examiner* — Roberta Delisle

(57) ABSTRACT

A wheel attachment assembly facilitates attachment of a trailer to a towing vehicle by providing a wheeled surface for transporting the trailer to the towing vehicle. The assembly includes a mount having a back wall and a bottom wall. The back wall is coupled to and extends upwardly from a rear edge of the bottom wall. The bottom wall is configured to support a jack post coupled to a tongue of a trailer wherein the jack post selectively raises and lowers the tongue of the trailer. A swivelable caster is coupled to a bottom surface of the bottom wall.

12 Claims, 3 Drawing Sheets

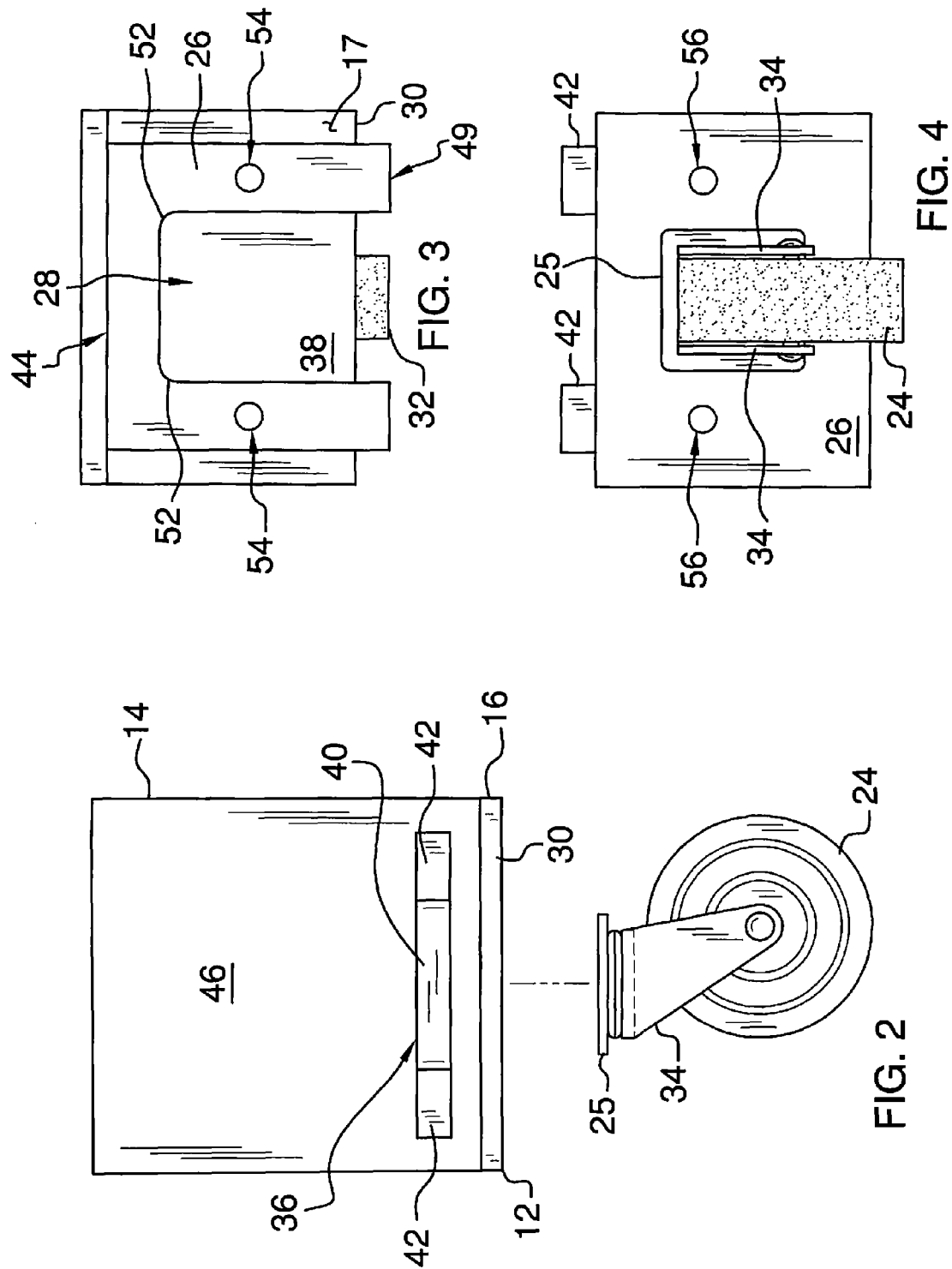

WHEEL ATTACHMENT ASSEMBLY

BACKGROUND OF THE DISCLOSURE

Field of the Disclosure

The disclosure relates to wheeled support devices and more particularly pertains to a new wheeled support device for facilitating attachment of a trailer to a towing vehicle by providing a wheeled surface for transporting the trailer to the towing vehicle.

SUMMARY OF THE DISCLOSURE

An embodiment of the disclosure meets the needs presented above by generally comprising a mount having a back wall and a bottom wall. The back wall is coupled to and extends upwardly from a rear edge of the bottom wall. The bottom wall is configured to support a jack post coupled to a tongue of a trailer wherein the jack post selectively raises and lowers the tongue of the trailer. A swivelable caster is coupled to a bottom surface of the bottom wall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a partially-exploded front view of an embodiment of the disclosure.

FIG. 3 is a top view of an embodiment of the disclosure.

FIG. 4 is a bottom view of an embodiment of the disclosure.

DESCRIPTION OF THE PREFERRED EMBODIMENT

Figure 1:
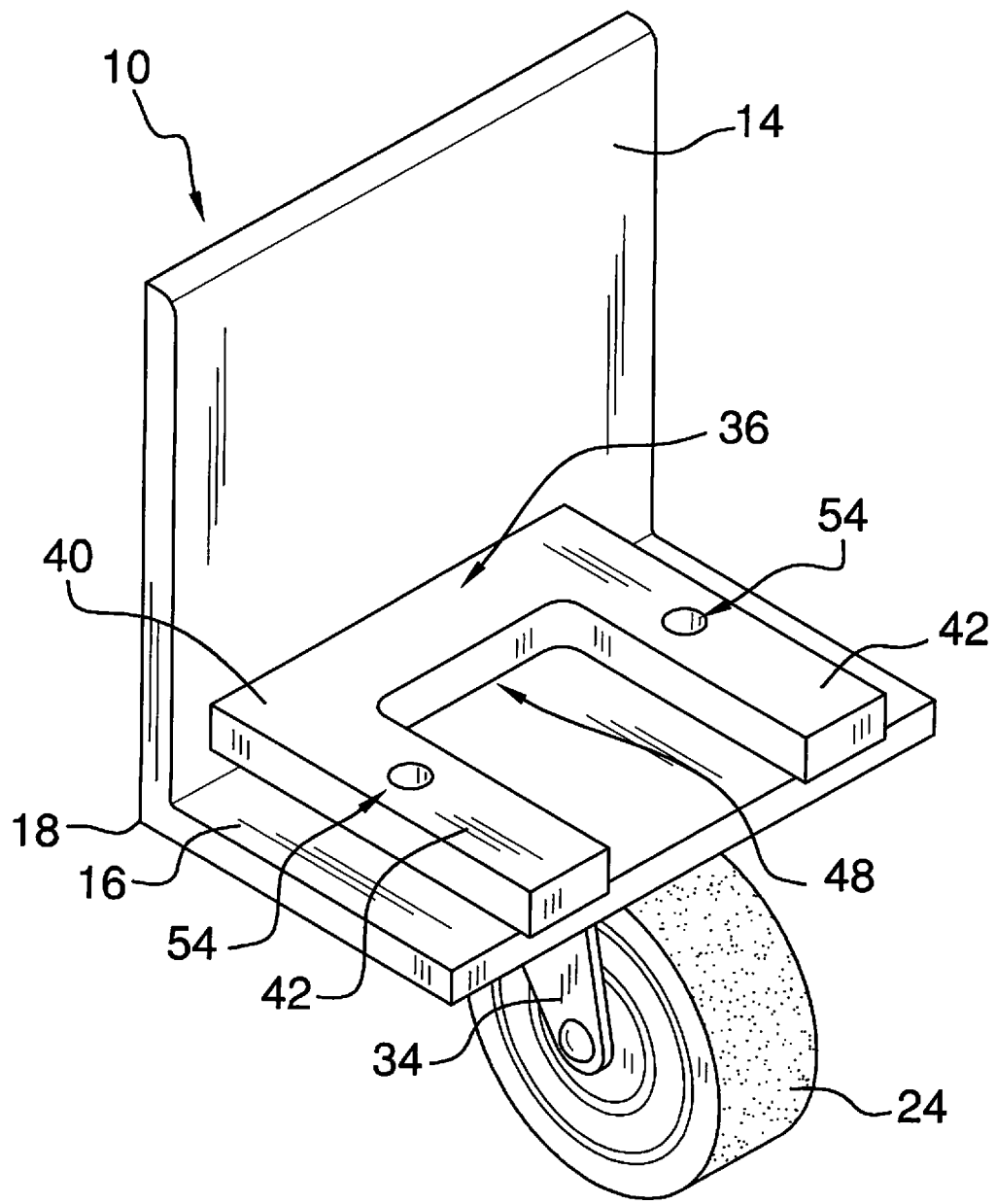
FIG. 1 is a top front side perspective view of a wheel attachment assembly according to an embodiment of the disclosure.
Figure 5:
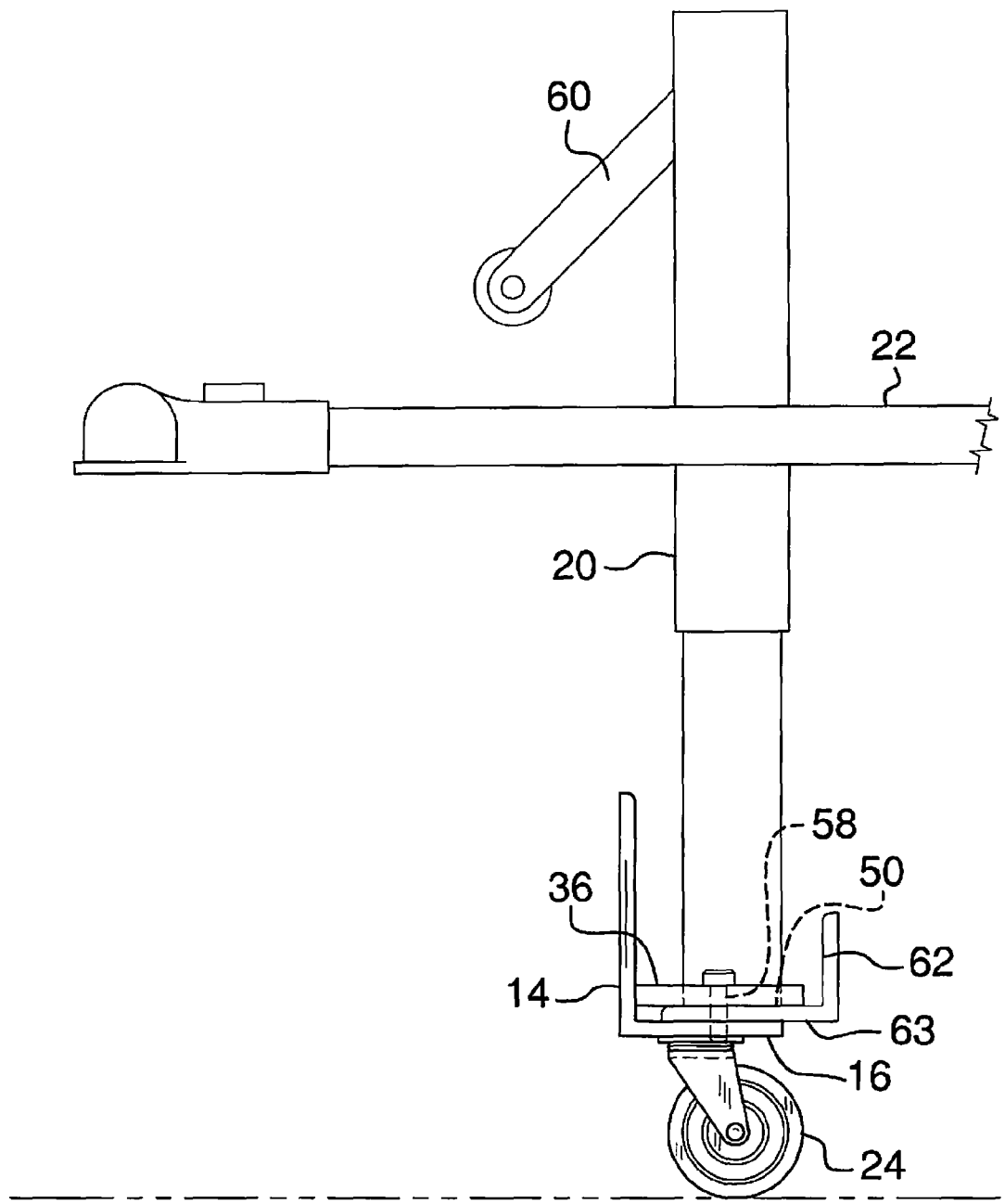
FIG. 5 is an in-use side view of an embodiment of the disclosure.

With reference now to the drawings, and in particular to FIGS. 1 through 5 thereof, a new wheeled support device embodying the principles and concepts of an embodiment of the disclosure and generally designated by the reference numeral 10 will be described.

As best illustrated in FIGS. 1 through 5, the wheel attachment assembly 10 generally comprises a mount 12 having a back wall 14 and a bottom wall 16. The back wall 14 is coupled to and extends upwardly from a rear edge 18 of the bottom wall 16. The bottom wall 16 is configured to support a jack post 20 coupled to a tongue 22 of a utility trailer wherein the jack post 20 selectively raises and lowers the tongue 22 of the trailer in a conventional manner. In particular, a handle 60 is coupled to the jack post 20 and is manipulated to raise and lower the tongue 22 of the trailer. A foot plate 62 is attached to a lower end 50 of the jack post 20 and is positionable on a top surface 17 of the bottom wall 16. The mount 12 is rigid and may be constructed from steel or like material. The assembly 10 may have a height between approximately 6.0 centimeters and 14.0 centimeters. The back wall 14 and the bottom wall 16 may each have a length and a width between approximately 12.0 centimeters and 20.0 centimeters.

A swivelable caster 24, wheel or roller, is coupled to a bottom surface 26 of the bottom wall 16. A plate 25 is coupled between the caster 24 and the bottom surface 26 of the bottom wall 16. The caster 24 may be removably coupled to the bottom surface 26 of the bottom wall 16 to allow the caster 24 to be removed from the assembly 10 and attached to a frame of the trailer using conventional locking pins or the like. In addition, the removable nature of the caster 24 allows the caster 24 to be removed from the frame of the trailer when the trailer is moved over rough terrain or a sloped surface, such as a driveway or the like. This helps to prevent the caster 24 from becoming damaged or being inadvertently detached from the frame of the trailer. The caster 24 is offset from a center 28 of the bottom wall 16. In particular, the caster 24 is positioned nearer to a front edge 30 of the bottom wall 16 than the rear edge 18 of the bottom wall 16 such that a front portion 32 of the caster 24 extends outwardly beyond the front edge 30 of the bottom wall 16 when the caster 24 is directed toward the front edge 30 of the bottom wall 16. A pair of leg mounts 34 is coupled to and extends downwardly from the bottom surface 26 of the bottom wall 16. The caster 24 is positioned between and coupled to each of the leg mounts 34 in a conventional manner.

A panel 36 is spaced above a top surface 38 of the bottom wall 16. The panel 36 includes a main section 40 and a pair of arms 42 coupled to and extending from the main section 40 in a same direction relative to each other. The arms 42 are positioned in spaced parallel relationship relative to each other. Each of the arms 42 extends outwardly beyond the front edge 30 of the bottom wall 16. In particular, a back 44 of the main section 40 of the panel 36 is attached to a front surface 46 of the back wall 14. The panel 36 is rigid and may be constructed from steel or like material. A notch 48 extends into the front end 49 of the panel 36 and extends inwardly between each of the arms 42. The notch 48 is configured to receive the lower end 50 of the jack post 20 therein to retain the jack post 20 on the bottom wall 16. A pair of interior arcuate junctures 52 each is formed between the main section 40 and an associated one of the arms 42. A horizontal portion 63 of the foot plate 62 is positionable between the panel 36 and the top surface 17 of the bottom wall 16. The horizontal portion 63 is positioned under each of the arms 42 and underneath the notch 48.

A plurality of holes 54 is positioned in the panel 36. A plurality of apertures 56 is positioned in the bottom wall 16 of the mount 12. The apertures 56 are aligned with an associated one of the holes 54. A pair of holes is drilled into the foot plate 62 that align with the holes 54 in the panel 36 and the apertures 56 in the bottom wall 16. A plurality of fasteners 58 is provided. Each of the fasteners 58 is extendable through and engages an associated one of the holes 54 in the panel 36 and a corresponding one of the apertures 56 in the bottom wall 16 as well as an associated one of the holes in the foot plate 62 to releasably retain the foot plate 62 on the bottom wall 16. In this manner, the fasteners 58 couple the jack post 20 to the panel 36 and the bottom wall 16. Each of the fasteners 58 may comprise a conventional locking pin or similar connector.

In use, as stated above and shown in the Figures, a jack post 20 of a trailer is positioned in the notch 48 of the panel 36 such that the jack post 20 rests upon the bottom wall 16. The jack post 20 is secured to the bottom wall 16 and the panel 36 using fasteners 58. The assembly 10 is then rolled to a towing vehicle via the caster 24 to move the trailer toward the towing vehicle. The jack post 20 is used in a conventional manner to raise and lower the tongue 22 of the trailer to a desired height for attachment of the trailer to the towing vehicle. After the trailer is hitched to the towing vehicle, the caster 24 can then be removed from the assembly 10 and attached to the frame of the trailer. The caster 24 can also be removed from the frame of the trailer when the trailer moves over rough terrain or a sloped surface to prevent damage to the caster 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wheel attachment assembly comprising:
   a mount having a back wall and a bottom wall, said back wall being coupled to and extending upwardly from a rear edge of said bottom wall, said bottom wall being configured to support a jack post coupled to a tongue of a trailer wherein the jack post selectively raises and lowers the tongue of the trailer;
   a swivelable caster coupled to a bottom surface of said bottom wall, and
   a panel being spaced above a top surface of said bottom wall, said panel including a main section and a pair of arms coupled to and extending from said main section in a same direction relative to each other, said arms being positioned in spaced parallel relationship relative to each other.

2. The assembly of claim 1, further comprising a notch extending into a front end of said panel and extending inwardly between each of said arms, said notch being configured to receive a lower end of the jack post therein to retain the jack post on said bottom wall.

3. The assembly of claim 2, further comprising a pair of interior arcuate junctures each being formed between said main section and an associated one of said arms.

4. The assembly of claim 1, further comprising:
   a plurality of holes positioned in said panel;
   a plurality of apertures positioned in said bottom wall of said mount, said apertures being aligned with an associated one of said holes when said panel is attached to said bottom wall; and
   a plurality of fasteners, each of said fasteners being extendable through and engaging an associated one of said holes in said panel and a corresponding one of said apertures in said bottom wall wherein said fasteners are configured to releasably couple the jack post to said panel and said bottom wall.

5. The assembly of claim 1, further comprising each of said arms extending outwardly beyond a front edge of said bottom wall.

6. The assembly of claim 1, further comprising a back of said main section of said panel being coupled to and abutting a front surface of said back wall.

7. The assembly of claim 1, further comprising said caster being offset from a center of said bottom wall.

8. The assembly of claim 7, further comprising a pair of leg mounts coupled to and extending downwardly from said bottom surface of said bottom wall, said caster being positioned between and coupled to each of said leg mounts.

9. The assembly of claim 1, further comprising said caster being removably coupled to said bottom surface of said bottom wall.

10. The assembly of claim 1, further comprising:
    said caster being offset from a center of said bottom wall, said caster being positioned nearer to a front edge of said bottom wall than said rear edge of said bottom wall such that a front portion of said caster extends outwardly beyond said front edge of said bottom wall when said caster is directed toward said front edge of said bottom wall, said caster being removably coupled to said bottom surface of said bottom wall;
    a pair of leg mounts coupled to and extending downwardly from said bottom surface of said bottom wall, said caster being positioned between and coupled to each of said leg mounts, each of said leg mounts extending forwardly away from said rear edge of said bottom wall toward said front edge of said bottom wall;
    each of said arms extending outwardly beyond a front edge of said bottom wall, a back of said main section of said panel being attached to a front surface of said back wall, a pair of interior arcuate junctures each being formed between said main section and an associated one of said arms;
    a notch extending into a front end of said panel, said notch extending between between each of said arms, said notch being configured to receive a lower end of the jack post therein to retain the jack post on said bottom wall;
    a plurality of holes positioned in said panel;
    a plurality of apertures positioned in said bottom wall of said mount, said apertures being aligned with an associated one of said holes when said panel is attached to said bottom wall; and
    a plurality of fasteners, each of said fasteners being extendable through and engaging an associated one of said holes in said panel and a corresponding one of said apertures in said bottom wall wherein said fasteners are configured to releasably couple the jack post to said panel and said bottom wall, each of said fasteners comprising a locking pin.

11. A wheel attachment assembly comprising:
    a mount having a back wall and a bottom wall, said back wall being coupled to and extending upwardly from a rear edge of said bottom wall, said bottom wall being configured to support a jack post coupled to a tongue of a trailer wherein the jack post selectively raises and lowers the tongue of the trailer;

a swivelable caster coupled to a bottom surface of said bottom wall a plurality of holes positioned in said panel;

a plurality of apertures positioned in said bottom wall of said mount, said apertures being aligned with an associated one of said holes when said panel is attached to said bottom wall; and a plurality of fasteners, each of said fasteners being extendable through and engaging an associated one of said holes in said panel and a corresponding one of said apertures in said bottom wall wherein said fasteners are configured to releasably couple the jack post to said panel and said bottom wall, each of said fasteners comprising a locking pin.

12. A wheel attachment assembly comprising:

a mount having a back wall and a bottom wall, said back wall being coupled to and extending upwardly from a rear edge of said bottom wall, said bottom wall being configured to support a jack post coupled to a tongue of a trailer wherein the jack post selectively raises and lowers the tongue of the trailer;

a swivelable caster coupled to a bottom surface of said bottom wall, said caster being offset from a center of said bottom wall;

a pair of leg mounts coupled to and extending downwardly from said bottom surface of said bottom wall, said caster being positioned between and coupled to each of said leg mounts;

each of said leg mounts extending forwardly away from said rear edge of said bottom wall toward a front edge of said bottom wall; and said caster being positioned nearer to said front edge of said bottom wall than said rear edge of said bottom wall such that a front portion of said caster extends outwardly beyond said front edge of said bottom wall when said caster is directed toward said front edge of said bottom wall.

\* \* \* \* \*